United States Patent [19]

Ramachandran et al.

[11] Patent Number: 5,322,927
[45] Date of Patent: Jun. 21, 1994

[54] METHOD FOR PRODUCING POLYMERS

[75] Inventors: Ramakrishnan Ramachandran, Allendale; Virginia Malik, Linden, both of N.J.

[73] Assignee: The BOC Group, Inc., Murray Hill, N.J.

[21] Appl. No.: 939,276

[22] Filed: Sep. 2, 1992

[51] Int. Cl.$^5$ .............................................. C08F 6/00
[52] U.S. Cl. .................................. 528/482; 528/483;
528/490; 528/498; 528/501; 526/77; 585/826;
585/829; 585/836; 585/851; 585/852; 585/864;
585/867; 585/868
[58] Field of Search .............. 528/482, 483, 501, 498,
528/490; 526/77; 585/821, 826, 829, 836, 851,
852, 864, 867, 868

[56] References Cited

U.S. PATENT DOCUMENTS

| | | | |
|---|---|---|---|
| 2,977,346 | 3/1961 | Cull | 528/482 |
| 3,280,091 | 10/1966 | Dance | 528/483 |
| 3,600,463 | 8/1971 | Hagemeyer, Jr. et al. | 528/482 X |
| 4,067,854 | 1/1978 | Fiorentino | 528/482 X |
| 4,133,842 | 1/1979 | Anderson | 585/809 X |
| 5,177,293 | 1/1993 | Mitariten et al. | 585/809 X |

Primary Examiner—Fred Teskin
Attorney, Agent, or Firm—Coleman R. Reap; Larry R. Cassett

[57] ABSTRACT

Polyolefins are produced by a process which includes the steps of: polymerizing an olefin in a reaction zone; removing unreacted olefin from the polymer in a flash chamber and recycling the unreacted olefin to the reaction zone; stripping unreacted olefin from the polymer by passing a stripping gas through the polymer in a stripping zone; passing the unreacted olefin from the stripping zone at superatmospheric pressure through an adsorbent which selectively adsorbs olefins; depressurizing the adsorbent to produce a substantially pure olefin and recycling the substantially pure olefin to the reaction zone; purging the adsorbent bed with a nonadsorbable gas to remove residual unreacted olefin from the adsorbent; and passing the purge gas-unreacted olefin to the stripping zone to be used as stripping gas.

25 Claims, 2 Drawing Sheets

METHOD FOR PRODUCING POLYMERS

BACKGROUND OF THE INVENTION

This invention relates to the polymerization of monomers and more particularly, to a method and apparatus for the polymerization of alpha-olefins which provides for the efficient removal of unreacted monomer from the polymeric product.

Polymers, such as polyolefins like polyethylene and polypropylene, are commonly produced by the vapor phase or liquid phase catalytic reaction of an alpha-olefin with or without an inert diluent. The polymeric product exiting the reactor is usually conveyed to a flash chamber wherein a major portion of the unreacted monomer and solvent is removed from the polymer and recycled to the polymerization reactor. The polymeric product, which still contains residual amounts of unreacted monomer and solvent is next transported to a stripping zone, wherein additional amounts of unreacted monomer and solvent are stripped from the polymeric product. This is generally accomplished by heating the polymeric product and/or passing an inert gas stream, such as steam or nitrogen through the polymer, thereby stripping additional amounts of unreacted monomer and solvent from the polymer. The unreacted monomer-solvent-inert gas mixture is then subjected to a separation process, such as distillation or adsorption to remove the inert gas from the unreacted monomer and solvent, and the latter are recycled to the polymerization reactor.

Japanese patent document Kokai Sho 60-79017 (1985) discloses a process for recovering unreacted olefinic monomer from a polymer product being discharged from a polymerization reactor. The invention of this patent document is stated to be an improvement over prior art procedures wherein the polymer from the polymerization reactor is stripped with nitrogen, thereby necessitating removal of the nitrogen by fractionation or adsorption before recycling the recovered monomer to the polymerization reactor. In the process of this patent document, unreacted monomer is stripped from the polymer with the corresponding alkane, i.e. an aliphatic saturated hydrocarbon having the same number of carbon atoms as the olefinic monomer, obtained from an alkene-alkane fractionator. The stripped gas is recycled to the fractionator.

Adsorption processes for the removal of the inert gas from the unreacted monomer-solvent mixtures are often preferred over distillation processes because of lower equipment and energy costs. It can be appreciated however, that the adsorption procedure practiced must be one that does not return inert gas to the polymerization reactor. Accordingly, if the adsorption cycle includes the step of purging the adsorption bed with the nonadsorbed gas stream without subsequently separating the purge gas from the desorbed product, the purged desorbate will contain inert gas, and accordingly, cannot be recycled to the polymerization reactor.

Because of the value of monomers, it is important to recover and recycle as much unreacted monomer as possible. The present invention provides a method and system for recovering substantially all of the unreacted monomer from the polymeric product while minimizing the introduction of inert gas into the polymerization system.

SUMMARY OF THE INVENTION

According to a broad aspect of the process of the invention, a polymer is prepared by a process comprising the steps of: polymerizing an ethylenically unsaturated monomer in a reaction zone in the vapor phase or liquid phase, either in the presence or absence of a diluent; passing the polymeric product through a stripping zone wherein a stripping gas sweeps unreacted monomer in the form of a gaseous stream from the polymer; subjecting the gaseous stream to a pressure swing adsorption (PSA) process comprising an adsorption phase in an adsorbent bed which adsorbs the unreacted monomer more strongly than other components of the gaseous stream, and a regeneration phase which includes the steps of (1) depressurizing the adsorption bed, thereby producing a substantially pure unreacted monomer stream and (2) passing a purge gas countercurrently through the adsorbent bed, thereby producing a purge stream containing the unreacted monomer and purge gas; recycling the substantially pure unreacted monomer to the reaction zone; and passing the purge stream from the PSA system through the stripping zone as the stripping gas. The purge gas is preferably an inert permanent gas, such as nitrogen, the nonadsorbed gas stream exiting from the PSA system or a saturated hydrocarbon. In a preferred embodiment of this aspect of the invention the monomer is an ethylenically unsaturated hydrocarbon having 2 to 4 carbon atoms.

In a modification of the above-described embodiment, part of the nonadsorbed gas stream is directly recycled to the stripping zone for use as a stripping gas. In this modification, step (2), i.e. the PSA system purge step, can be eliminated, if desired. However, in a preferred aspect of this modification it is not eliminated, and both nonadsorbed product gas and the purge gas from the PSA system are used as stripping gas.

In one preferred embodiment of the process of the invention, the countercurrent purge gas is a saturated hydrocarbon. In another preferred embodiment, the adsorption bed is cocurrently purged with a monomer-rich gas stream after terminating the flow of feed gas to the PSA system but prior to the regeneration step. In another preferred embodiment, the polymeric product exiting the reaction zone is passed through a flash zone, thereby removing unreacted monomer from the product, and the unreacted monomer is recycled to the reaction zone. In another preferred embodiment, the monomer is an alpha-olefin and the purge gas introduced into the PSA system is a saturated hydrocarbon, and the polymeric product exiting the stripping zone is passed through a second stripping zone wherein it is further stripped with an inert permanent gas, thereby removing residual saturated hydrocarbon from the polymer.

A more specific embodiment of the process of the invention comprises passing a mixture of an alkene and the corresponding alkane through a fractionation zone wherein the alkene is separated from the alkane; polymerizing the alkene; passing the polymeric product through a stripping zone wherein a stripping gas comprising the corresponding alkane sweeps unreacted alkene from the polymer; subjecting the alkane-unreacted alkene mixture to a pressure swing adsorption (PSA) process comprising an adsorption phase in an adsorbent bed which adsorbs the unreacted alkene more strongly than the alkane, and a regeneration phase which includes the steps of depressurizing the adsorption bed, thereby producing substantially pure unreacted alkene, and passing alkane through the adsorbent bed as a purge gas, thereby producing a purge stream containing alkane and unreacted alkene; recycling the substantially pure unreacted alkene to the reaction zone; and passing the purge stream from the PSA system through the stripping zone as stripping gas.

As was the case with the broad embodiment described above, the more specific embodiment just described can be modified so that part of the nonadsorbed gas stream is directly recycled to the stripping zone for use as a stripping gas and the PSA system purge step is preferably included, but can be eliminated, if desired.

In a refinement of the most preferred embodiment, the polymeric product leaving the stripping zone enters a second stripping zone wherein the polymer is stripped of alkane entrained therein by passing inert gas such as nitrogen, through the polymer.

The invention also includes a system for producing polyolefins by the process of the invention comprising:

(a) a reactor for converting an olefinic monomer to a polyolefin-rich product;

(b) a stripper adapted to receive the polylolefin-rich product from the reactor and strip unreacted monomer therefrom by passing a stripping gas through the polyolefin-rich product;

(c) a PSA system which contains an adsorbent which selectively adsorbs unreacted monomer and which is adapted to receive a feed stream comprising the stripped unreacted monomer-containing stream at superatmospheric pressure and adsorb unreacted monomer therefrom;

(d) conduiting to convey unreacted monomer desorbed from the PSA system during a bed depressurization step and recycle it to the reactor;

(e) purge gas means adapted to purge residual unreacted monomer from the adsorbent; and (f) conduit means to convey the purged unreacted monomer and/or nonadsorbed gas product from the PSA system to the stripper for use as a stripping gas.

BRIEF DESCRIPTION OF THE DRAWINGS

The invention is illustrated in the drawings, in which.

In the drawings like characters designate like or corresponding parts throughout the several figures. Auxiliary valves, lines and equipment not necessary for an understanding of the invention have been omitted from the drawings.

DETAILED DESCRIPTION OF THE INVENTION

Figure 1:
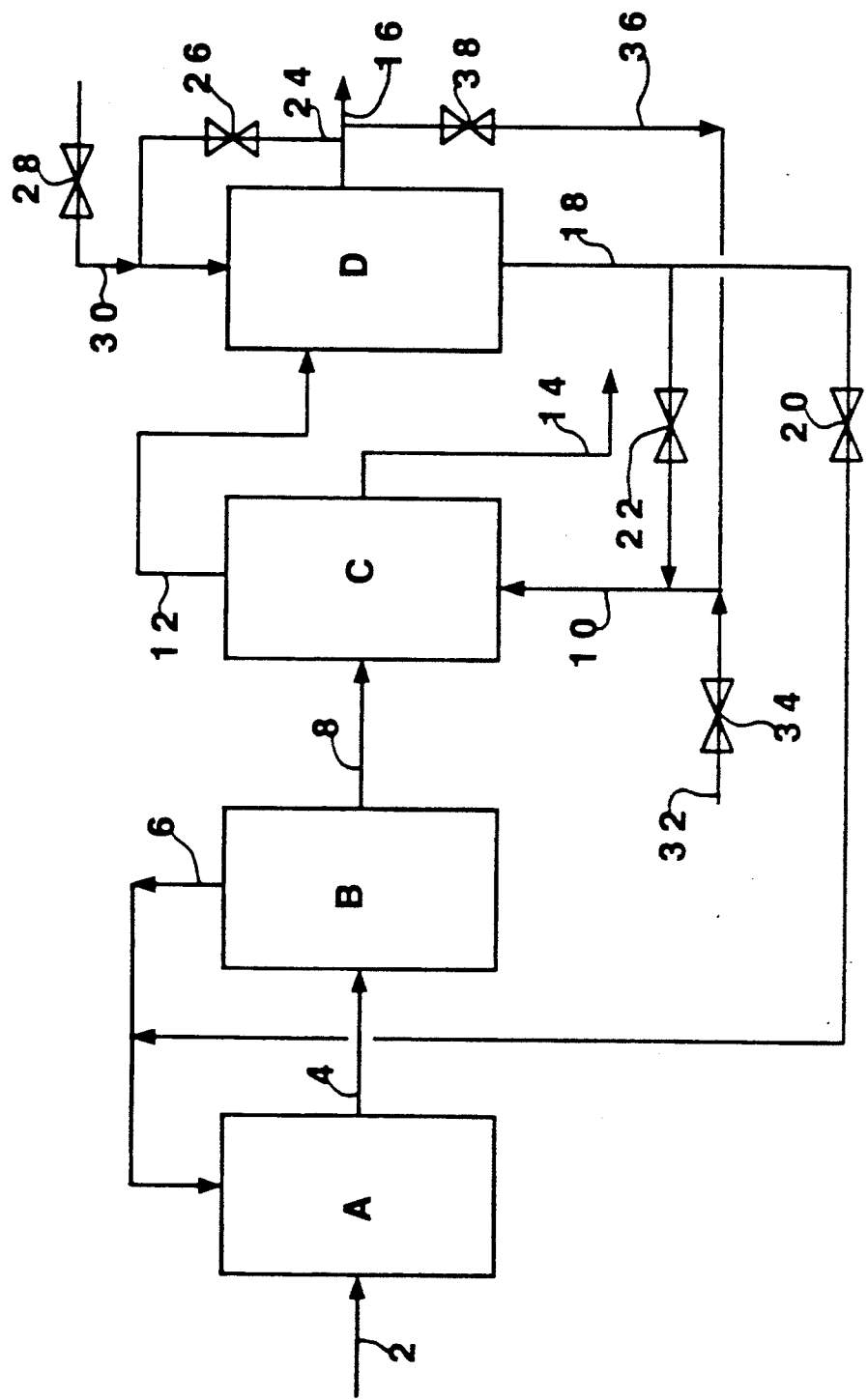
FIG. 1 is a schematic representation of a first embodiment of a system for producing a polyolefin by the process of the invention.

The invention is particularly useful for the polymerization of any low molecular ethylenically unsaturated monomers, including monoolefins and diolefins having 2 to 4 carbon atoms, vinyl halides, acrylic monomers, etc. Examples of these include ethene, propene, the butenes, butadiene, vinyl chloride, acrylic acids, acrylic esters, acrylonitrile, etc. For the purpose of symplifying the description of the preferred embodiments, however, the invention will be described with particular reference to the polymerization of olefins, especially ethylene, propylene, the butenes and butadiene.

The polymerization may be carried out in the gas phase or the liquid phase, and in the presence or absence of a solvent or diluent. The invention is particularly useful for the production of polyethene or polypropene using ethene and propene feed stocks which contain up to about 0.5% ethane and propane, respectively. Lower purity feedstocks can be efficiently used in the process of the invention because of the ease with which unreacted monomer is separated from the corresponding alkane in the PSA system of the equipment train.

On completion of the polymerization step the polymeric product, which contains, in addition to the polymer, unreacted monomer, and solvent or diluent, if one is used, is treated in a series of steps to remove the unreacted monomer and solvent. The first treatment zone is generally a flash chamber wherein the polymeric product is subjected to a pressure drop thereby causing much of the unreacted monomer and solvent to flash and separate from the polymer. The separated monomer and solvent is recycled to the polymerization reactor.

The polymeric product leaving the flash chamber may still contain a significant concentration of unreacted monomer and solvent as impurities; accordingly it is usually next sent to a stripper column or a series of stripper columns to remove substantially all of the remaining volatile impurities. In the stripping column(s) the polymer is stripped of volatiles by passing an inert stripping gas through it. The gaseous effluent from the first stripper is next sent to a PSA system to separate unreacted monomer from the stripping gas, since this stream contains considerable quantities of valuable unreacted monomer.

The PSA system used in the invention contains an adsorbent which adsorbs alkenes more strongly than alkanes and inert permanent gases, such as nitrogen. As the gaseous stripper effluent passes through the PSA system, the olefinic monomer, and solvent (if any remains) is adsorbed and the other components of the gas stream pass through the bed. The adsorption bed is regenerated by a multi-step procedure. One step comprises depressurizing the bed to desorb high purity monomer therefrom. The high purity monomer is recycled to the polymerization reactor. Another step comprises countercurrently purging the bed with a nonadsorbable gas, such as nitrogen or a low molecular weight alkane. The purge stream exiting the PSA unit is recycled to the first stripper to serve as a stripping gas. Alternatively or additionally, part of the nonadsorbed product gas can be recycled to the stripper as stripping gas. The unreacted monomer in the purge gas and the nonadsorbed product gas stream is thus recycled through the PSA system, thereby enhancing monomer recovery.

The apparatus used in the first embodiment of the invention and the arrangement of the various units in this embodiment is illustrated in FIG. 1. The equipment units include a polymerization reactor, A, a flash vessel, B, an unreacted monomer stripper, C, and a gas separator, D. These units of equipment are all well known and their design features do not constitute a part of the present invention.

The process of the invention will now be specifically described in greater detail with reference to the accompanying drawings. Turning now to FIG. 1, a feed stream comprising an olefin of the type described above is introduced into reactor A, through line 2. A catalyst and other additives may be introduced into reactor A either with the feed or separately through feed lines not shown in FIG. 1. Reactor A may be any conventional polymerization reactor in which the vapor phase or liquid phase polymerization of olefins is carried out, either on a continuous or batch basis. The monomer contacts the catalyst in reactor A at a suitable temperature and pressure and a portion of the monomer is converted to polymer. The polymer together with unreacted monomer, diluents, etc. leave reactor A through line 4 and, in the embodiment shown in FIG. 1, is transported to flash vessel B, wherein unreacted monomer and diluent or solvent (if present) is removed from the polymer.

Flash chamber B is a conventional flash vessel, typically equipped with heating and agitating means. The separation of volatiles from polymer in flash chamber B is generally effected by heating the polymeric product with the absorbed monomer, perhaps at a reduced pressure. Unreacted monomer and solvent (when present) leave flash chamber B through line 6 and are recycled to reactor A. The polymer, which still contains some monomer, passes out of vessel B through line 8 and next enters stripper or polymer purge unit C.

Stripper C is provided with means for providing intimate contact between a stripping gas and the polymeric product moving through stripper C. The stripping gas enters stripper C through line 10, passes through the polymer, thereby sweeping unreacted monomer and other volatiles from the polymer, and exits the stripper through line 12. The polymer leaves stripper C through line 14 and is conveyed to downstream treating units, such as extruders. The stripped monomer and stripping gas mixture pass through line 12 and into separator D.

Separator D is a pressure swing adsorption (PSA) system. It may comprise a single adsorption bed or a battery of beds arranged in series or parallel or in combinations of these. In preferred plants the PSA system comprises two or more adsorbent beds cycled out of phase to provide a pseudo-continuous recycle of unreacted hydrocarbon to reactor A. Preferred PSA plants comprise two or more beds operated in a cyclic process comprising adsorption under relatively high pressure and desorption or bed regeneration under relatively low pressure or vacuum.

The function of Separator D is to adsorb unreacted olefin from the stripper effluent, which generally contains unreacted olefin, saturated hydrocarbon impurities, the stripping gas, and possibly various other gaseous components, such as nitrogen, carbon oxides and small amounts of oxygen. Olefins are generally more strongly adsorbed by many adsorbents than are the other components of the unit C effluent; accordingly, unit D contains an adsorbent which more strongly adsorbs the unreacted monomer than the other components of the stripper B effluent. Typical of the adsorbents useful in unit D are zeolite molecular sieves, activated carbon, silica gel, activated alumina, etc., with or without metal ions.

As the gaseous effluent from unit C passes through separator D substantially all of the unreacted olefin is adsorbed by the adsorbent contained therein. The nonadsorbed gases leave separator D through waste gas discharge line 16. When the unreacted olefin front reaches a predetermined point in separator D, the flow of feed to separator D is terminated and the regeneration phase of the cycle is begun.

The regeneration phase generally consists of at least two steps, a countercurrent depressurization step and a purge step. During the countercurrent depressurization step, an unreacted olefin-rich product is desorbed from the adsorbent bed and discharged from system D through line 18. During this step of the bed regenration, valve 20 is open and valve 22 is closed. This portion of the desorbate is recycled to reactor A via line 18, open valve 20 and line 6. The countercurrent depressurization step may be carried out until the adsorbent bed attains atmospheric pressure or it may be evacuated to subatmospheric pressure by means of a vacuum inducing device, such as a vacuum pump (not shown).

Towards the end of the countercurrent depressurization step, or subsequent thereto, the purge step of the regeneration is initiated. During this step valve 22 is open and valve 20 is closed, and a nonadsorbable purge gas is passed countercurrently through the adsorbent bed. The purge gas may be nonadsorbed product gas exiting separator D through line 16 or a nonadsorble gas obtained from a different source. When the nonadsorbed gas from separator D is used, it passes through line 24 and valve 26. Other nonadsorbable gases may be introduced into separator D through valve 28 and line 30. Suitable nonadsorbable gases include inert permanent gases, such as nitrogen, and lower molecular weight saturated hydrocarbons, such as alkanes having the same number of or fewer carbon atoms as the olefin used as the monomer. It can be appreciated, of course, that when the nonadsorbed gas from separator D or an alkane is used no nitrogen will be introduced into the system. This may be advantageous when it is desired to produce a relatively pure alkane byproduct as the nonadsorbed product.

The purge gas passing through the adsorbent bed during the purge step effects further desorption of unreacted olefin from the bed. The desorbed olefin-purge gas mixture is discharged from separator D through line 18 and passes through valve 22 and line 10 and into stripper C, where it serves as a stripping gas.

In an alternative mode of operation of the system of FIG. 1, nonadsorbed gas product exiting separator D through line 16 is recycled to stripper C through line 36 and valve 38 for use as stripping gas. In this mode, regeneration of separator D can be conducted with or without the purge step; however, in the preferred procedure the purge step is included and both the purge gas exiting separator D through line 18 and the nonadsorbed gas from separator D are recycled to stripper C as stripping gas.

In some cases the quantity of stripping gas provided from separator D through line 18 and/or line 36 may be insufficient to satisfactorily strip the unreacted olefin from the polymer passing through stripper C. In this case supplemental stripping gas can be supplied through line 32 and valve 34. The supplemental stripping gas, which can be an inert gas such as nitrogen, or an alkane, can be provided continuously or intermittently to stripper, and if it is supplied intermittently it can be provided simultaneously or sequentially with the gas being discharged from separator D.

The adsorption cycle may contain steps other than the fundamental steps of adsorption and regeneration. For example, it may be advantageous to depressurize the adsorption bed in two steps, with the first depressurization product being used to partially pressurize another bed in the adsorption system. This will reduce the amount of non-olefin gases recycled to reactor A. It may also be desirable to include a cocurrent purge step between the adsorption phase and the regeneration phase. The cocurrent purge is effected by terminating the flow of feed gas into separator D and passing high purity olefin cocurrently into the adsorption bed at adsorption pressure. This has the effect of forcing nonadsorbed gas in the void spaces in separator D toward the nonadsorbed gas outlet, thereby ensuring that the olefin produced during the countercurrent depressurization will be of high purity. The high purity olefin gas used for the cocurrent purge can be obtained from an intermediate storage facility in line 18 (not shown) when separator D comprises a single adsorber, or from another adsorber that is in the adsorption phase, when separator D comprises multiple adsorbers arranged in parallel and operated out of phase, or from olefin feed line 2.

Figure 2:
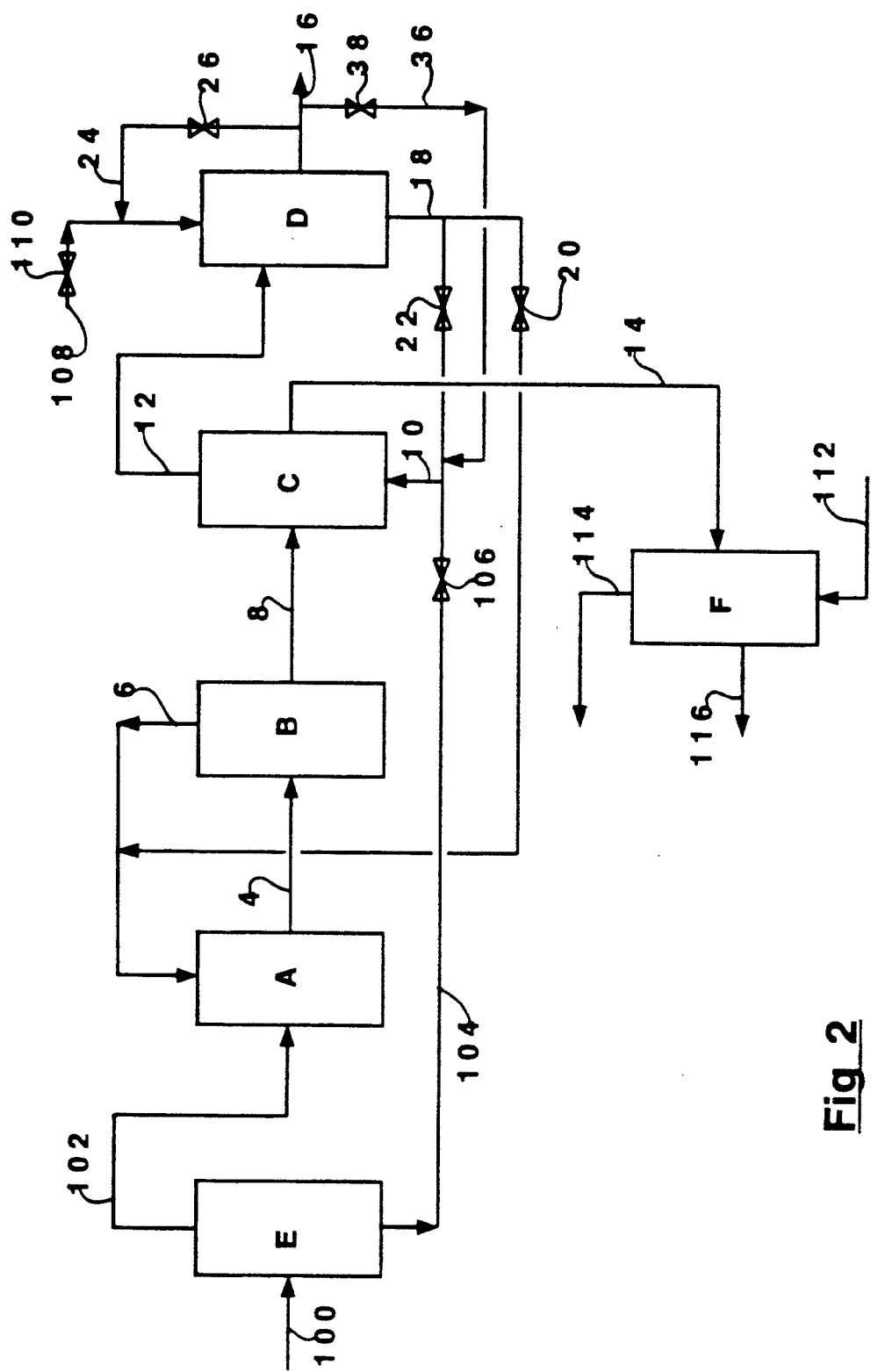
FIG. 2 is a schematic representation of a second embodiment of a system for practicing the process of the invention.

The apparatus used in the second embodiment of the invention and the arrangement of the various units in this embodiment is illustrated in FIG. 2. Polymerization reactor A, flash chamber B, stripper C, and gas separator D of FIG. 2 are identical to the corresponding units of FIG. 1. In addition to these units, the system of FIG. 2 includes a fractionator, E, and a second stripper, F. The additional units of equipment are well known and their design features do not constitute a part of the present invention.

The system of FIG. 2 is designed to accept a feed stream comprised substantially of an alkene monomer but containing one or more alkanes as impurities. Typical of such feed streams are commercial grade ethene and propene, which comprise about at least 99% by volume alkene and up to about 0.5 volume % of the corresponding alkane, i.e. ethane and propane, respectively.

Fractionator E can be any piece of equipment or system that is capable of separating an alkene from the corresponding alkane. Typical of suitable fractionators are fractional distillation columns, commonly known as splitters, adsorption systems and semipermeable membranes. Stripper F can be similar to stripper C.

The process that takes place in the system of FIG. 2 is similar to the process described above with respect to FIG. 1, with the following exceptions. In the operation of the process of the invention in the system illustrated in FIG. 2, a feed stream comprising a mixture of an alkene and the corresponding alkane are introduced into fractionator E through line 100. The feed mixture is separated in fractionator E into an alkene-rich stream, which leaves fractionator E through line 102, and an alkane-rich stream, which leaves this unit through line 104. The alkene-rich stream passes through line 102 and enters reactor A. This stream may have the same composition as the feed stream entering reactor A of FIG. 1 through line 2.

The alkane-rich stream produced in fractionator E, or a portion thereof, leaves this unit through line 104 and it serves as supplemental stripping gas for stripper C. The principal sources of stripping gas for stripper C are, of course, the purge stream exiting separator D through line 18 and valve 22 and/or the nonadsorbed product gas passing through line 36 and valve 38. Line 104 and valve 106 of the system of FIG. 2 are equivalent to line 32 and valve 34 of the system of FIG. 1.

In the preferred mode of operation of the system of FIG. 2, separator D is purged with the nonadsorbed gas stream exiting separator D through line 16. It can be appreciated that this gas stream will be comprised substantially of the alkane being introduced into stripper C through line 104 and any nonadsorbable impurities contained in the feed stream entering stripper C through line 8. As an alternative to the use of the nonadsorbed gas from separator D as a purge gas, an alkane, such as the alkane leaving fractionator E through line 104, can be used as the purge gas for separator D. In this case the alkane purge gas is introduced into separator D through line 108 and valve 110. Thus, it can be seen that very little or no nitrogen will be introduced into stripper C or reactor A from the purging and stripping steps carried out in units C and D.

In the system of FIG. 2, the polymer product leaving stripper C through line 14 of the system of FIG. 2 flows into stripper F, wherein it is stripped of entrained alkane. As the polymer product moves through stripper F, a stripping stream, preferably comprised of an inert permanent gas such as nitrogen, passes through it. The stripping gas enters stripper F through line 112 and exits this unit through line 114, together with the alkane and other impurities stripped from the polymer in stripper F. These gases can be passed to flare or downstream processing units, such as additional PSA systems. The polymer exiting stripper F through line 116 is likewise subjected to further processing, such as extrusion.

The process of the invention has several advantages over prior art processes. Purging the PSA system represented as separator D with an inert gas and returning this gas to an upstream part of the system enhances the recovery of unreacted monomer. When the nonadsorbed gas is used as a purge gas for the PSA unit and/or as a stripping gas for the stripping operation, the overall efficiency of the PSA process is enhanced because of the reduced loss of unreacted olefin in the nonadsorbed effluent from the system. Using the same gas stream as a purge gas for the PSA system and as a stripping gas for stripping C also minimizes the amount of inert gas introduced into the system in the unreacted monomer recovery steps of the process. Another advantage is realized by practicing the process of the invention in the system of FIG. 2. Since any alkene contained in the stripping gas stream flowing through line 104 is recovered in separator D, fractionator E can be operated in a manner that produces lower purity alkane-rich stream.

Although the invention has been described with particular reference to the specific systems illustrated in the drawings, modifications of these embodiments are contemplated. For example, the nonadsorbed product stream from the PSA system can be further treated to recover unreacted olefin remaining in this stream. Also, part of the purge stream exiting separator D can be directly recycled to the feed line to this unit. Also, with respect to the system of FIG. 2, the purge stream exiting stripper F through line 114 can be further treated to recover alkane from the stream. Furthermore, if desired, The purge gas exiting separator D can be the sole source of stripping gas for stripper C. The scope of the invention is limited only by the breadth of the appended claims.

What is claimed is:
1. A process for producing a polymer comprising;
(a) contacting a feed gas comprising an ethylenically unsaturated monomer with a polymerization catalyst in a reaction zone, thereby producing a polymeric product;
(b) passing said polymeric product through a stripping zone wherein a stripping gas sweeps gaseous unreacted monomer from the polymer;

(c) cocurrently passing the gaseous unreacted monomer-stripping gas mixture at superatmospheric pressure through a PSA system comprising an adsorption bed which adsorbs said unreacted monomer more strongly than other components of the gaseous stream, thereby adsorbing unreacted monomer from said monomer-stripping gas mixture and producing a monomer-lean nonadsorbed product gas;

(d) countercurrently depressurizing said adsorption bed, thereby producing an unreacted monomer-rich product;

(e) countercurrently purging said adsorption bed with a substantially nonadsorbable gas, thereby producing a purge stream containing residual unreacted monomer and purge gas;

(f) recycling the unreacted monomer-rich product to the reaction zone; and (g) passing said purge stream to said stripping zone as stripping gas.

2. The process of claim 1, wherein said monomer is an olefin.

3. A process for producing a polymer comprising;
(a) contacting a feed gas comprising a monomer with a polymerization catalyst in a reaction zone, thereby producing a polymeric product;
(b) passing said polymeric product through a stripping zone wherein a stripping gas sweeps gaseous unreacted monomer from the polymer;
(c) cocurrently passing the gaseous unreacted monomer-stripping gas mixture at superatmospheric pressure through a PSA system comprising an adsorption bed which adsorbs said monomer more strongly than other components of the gaseous stream, thereby adsorbing unreacted monomer from said monomer-stripping gas mixture and producing an monomer-lean nonadsorbed product gas;
(d) countercurrently depressurizing said adsorption bed, thereby producing an unreacted monomer-rich product;
(e) recycling the unreacted monomer-rich product to the reaction zone; and
(f) passing monomer-lean nonadsorbed product gas to said stripping zone as stripping gas.

4. The process of claim 3, wherein said monomer is an olefin.

5. The process of claim 4, additionally comprising countercurrently purging the adsorption bed with a substantially nonadsorbable gas subsequent to step (d), thereby producing a countercurrent purge stream containing residual unreacted monomer and purge gas, and passing said purge stream to said stripping zone as stripping gas.

6. The process of any one of claims 2, 4, or 5, comprising the additional step of cocurrently purging the adsorption bed with a monomer-rich stream between steps (c) and (d).

7. The process of claim 6, wherein said monomer-rich stream is said unreacted monomer-rich product.

8. The process of claim 2 or claim 4, further comprising stripping the polymeric product from step (b) with nitrogen.

9. The process of claim 2 or claim 4, wherein said polymeric product is stripped first with an alkane having 1 to 3 carbon atoms and then with nitrogen.

10. The process of claim 2 or claim 4, wherein said adsorption bed contains an adsorbent selected from zeolite molecular sieves, activated carbon, silica gel, activated alumina and mixtures of these.

11. The process of claim 2 or claim 4, wherein prior to step (b) unreacted monomer is removed from said polymeric product in a flash zone and recycled to said reaction zone.

12. The process of claim 2 or claim 4, wherein said olefin is a monoolefin or diolefin having 2 to 4 carbon atoms.

13. The process of claim 12, wherein said olefin is ethene and said stripping gas comprises ethane.

14. The process of claim 12, wherein said olefin is propene and said stripping gas comprises propane.

15. The process of claim 2 or claim 5, wherein said substantially nonadsorbable gas is selected from nitrogen, the nonadsorbed product gas exiting the PSA system, an alkane having 1 to 3 carbon atoms and mixtures of these.

16. The process of claim 2 or claim 5, wherein said substantially nonadsorbable gas is an alkane having the same number of carbon atoms as said olefin.

17. A process for producing a polyolefin comprising;
(a) fractionating a mixture of an olefin and an alkane having the same number of carbon atoms as said olefin into an olefin-rich stream and an alkane-rich stream;
(b) contacting said olefin-rich stream with a polymerization catalyst in a reaction zone, thereby producing a polymeric product;
(c) passing said polymeric product through a stripping zone wherein a stripping gas comprising said alkane-rich stream sweeps gaseous unreacted olefin from the polymer;
(d) cocurrently passing the gaseous unreacted olefin-stripping gas mixture at superatmospheric pressure through a PSA system comprising an adsorption bed which adsorbs unreacted olefin more strongly than other components of the gaseous stream, thereby adsorbing unreacted olefin from said olefin-stripping gas mixture and producing an olefin-lean nonadsorbed product gas;
(e) countercurrently depressurizing said adsorption bed, thereby producing an unreacted olefin-rich product;
(f) countercurrently purging said adsorption bed with a substantially nonadsorbable gas, thereby producing a purge stream containing residual unreacted olefin and purge gas;
(g) recycling the unreacted olefin-rich product to the reaction zone; and
(h) passing said purge stream to said stripping zone as stripping gas.

18. The process of claim 17, wherein said purge gas is selected from nitrogen, the olefin-lean nonadsorbed product gas exiting the PSA system, said alkane-rich stream and mixtures of these.

19. The process of claim 17, further comprising stripping the polymeric product from step (b) with nitrogen.

20. The process of claim 17, wherein said polymeric product is stripped first with said alkane-rich stream and then with nitrogen.

21. The process of claim 17, comprising the additional step of cocurrently purging the adsorption bed with an olefin-rich stream between steps (d) and (e).

22. The process of claim 17, wherein said adsorption bed contains an adsorbent selected from zeolite molecular sieves, activated carbon, silica gel, activated alumina and mixtures of these.

23. The process of claim 17, wherein prior to step (b) unreacted olefin is removed from said polymeric product in a flash zone and recycled to said reaction zone.

24. The process of claim 17, wherein said olefin is a ethene and said alkane is ethane.

25. The process of claim 17, wherein said olefin is propene and said alkane is propane.

* * * * *